Oct. 30, 1962    M. ZURAWINSKI ETAL    3,061,242
AUTOMATIC CONTROL APPARATUS

Filed Sept. 23, 1960    7 Sheets-Sheet 1

INVENTORS
CHARLES M. SPERAZZ Sr.
MITCHELL ZURAWINSKI
BY Beau, Brooks, Buckley & Beau,
ATTORNEYS.

FIG. 6

INVENTORS
CHARLES M. SPERAZZ SR.
BY MITCHELL ZURAWINSKI
Beau, Brooks, Buckley & Beau,
ATTORNEYS.

Oct. 30, 1962 M. ZURAWINSKI ETAL 3,061,242
AUTOMATIC CONTROL APPARATUS
Filed Sept. 23, 1960 7 Sheets-Sheet 5

INVENTOR.
CHARLES M. SPERAZZ Sr.
MITCHELL ZURAWINSKI
BY
Beau, Brooks, Buckley & Beau Oct. 30, 1962 M. ZURAWINSKI ETAL 3,061,242
AUTOMATIC CONTROL APPARATUS
Filed Sept. 23, 1960 7 Sheets-Sheet 6

INVENTOR.
CHARLES M. SPERAZZ Sr.
MITCHELL ZURAWINSKI
BY

*Beau, Brooks, Buckley & Beau.*

Oct. 30, 1962  M. ZURAWINSKI ETAL  3,061,242
AUTOMATIC CONTROL APPARATUS
Filed Sept. 23, 1960  7 Sheets-Sheet 7

LEFT ROLL (BY STICK)
IN HORIZONTAL FLIGHT

FIG. 12

LEFT ROLL AND YAW
IN HORIZONTAL FLIGHT

FIG. 13

INVENTOR.
CHARLES M. SPERAZZ Sr.
MITCHELL ZURAWINSKI
BY
Bean, Brooks, Buckley & Bean.

United States Patent Office 3,061,242
Patented Oct. 30, 1962

3,061,242
AUTOMATIC CONTROL APPARATUS
Mitchell Zurawinski, Columbus, Ohio, and Charles M. Sperazz, Sr., Williamsville, N.Y., assignors to Bell Aerospace Corporation, Wheatfield, N.Y.
Filed Sept. 23, 1960, Ser. No. 58,020
9 Claims. (Cl. 244—23)

This invention relates to vertical take-off and landing fixed wing aircraft having ducted propeller type propulsion units pivotally mounted thereon for swinging between vertical lift and horizontal propulsion attitudes. More particularly, the present invention relates to propulsion unit thrust direction and force control means in such aircraft, whereby aircraft attitude and maneuvering control is obtained.

One of the objects of the present invention is to provide in an aircraft of the aforesaid type an improved propeller thrust force control mechanism to facilitate attitude and maneuvering control of the aircraft throughout all phases of ascending, descending, hovering, and transitional flight.

Another object is to provide an improved control means as aforesaid providing output thrust modifying control vanes and improved actuation mechanism therefor, whereby pilot manual control motions are translated automatically into ideally coordinated aircraft attitude control effects relative to all attitude axes of the aircraft, whether the propulsion units are disposed in vertically or horizontally directed attitudes.

Other objects and advantages of the invention will appear from the specification hereinafter and the drawings herewith which illustrate one exemplification of the invention; in which drawings.

Figure 1:
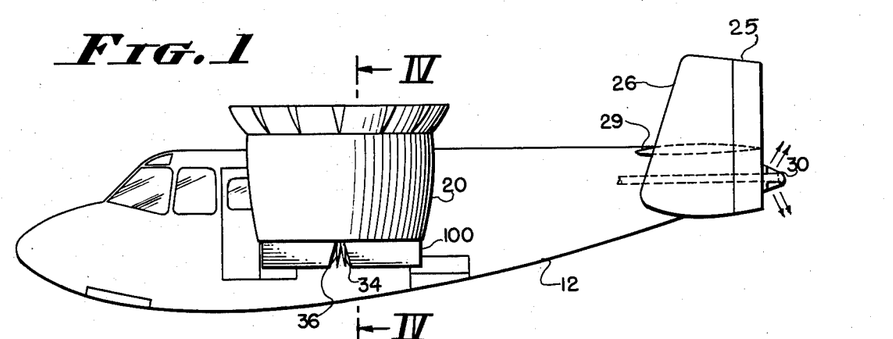
FIG. 1 is a side elevational view of an aircraft of the type hereinabove referred to, embodying a control mechanism of the invention and showing the ducted propeller propulsion units thereof disposed in vertical attitudes.
Figure 2:
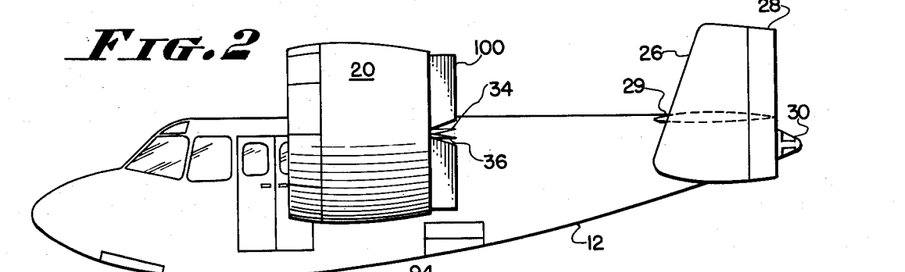
FIG. 2 is a view corresponding to FIG. 1, but showing the propulsion units disposed in horizontal attitudes.
Figure 3:
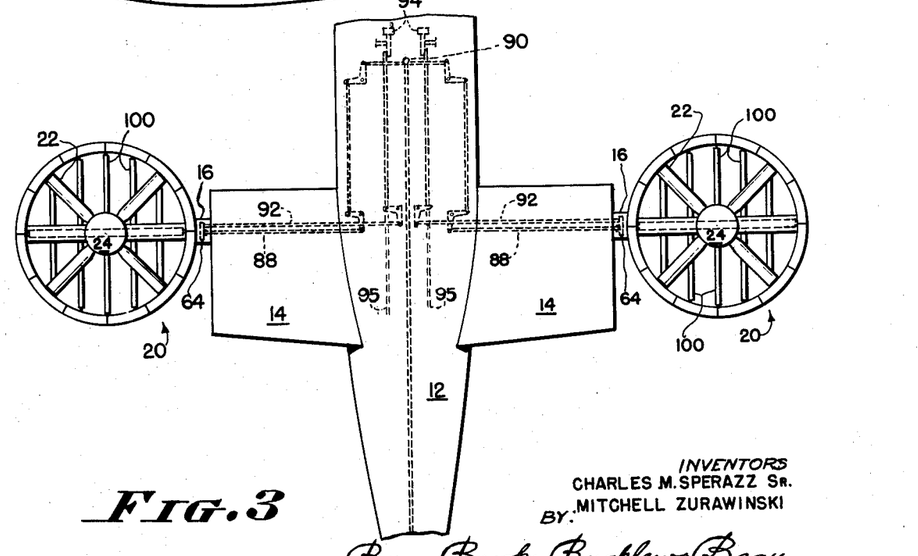
FIG. 3 is a fragmentary top plan view of the aircraft showing the propulsion units in vertically disposed positions and the aircraft pilot control system schematically.

As shown in the drawing at FIGS. 1-3, the present invention has particular application to aircraft of the fixed wing type wherein the lift-propulsion propellers are "ducted" within cowlings which are mounted upon the aircraft so as to be rotatable thereon between vertically directed and horizontally directed attitudes. The ducted propellers may be conveniently mounted upon the outboard ends of the wing panels as shown herein; or may be otherwise located on the aircraft at opposite sides thereof to provide the lift and propulsion and attitude control features hereinafter described.

Figure 7:
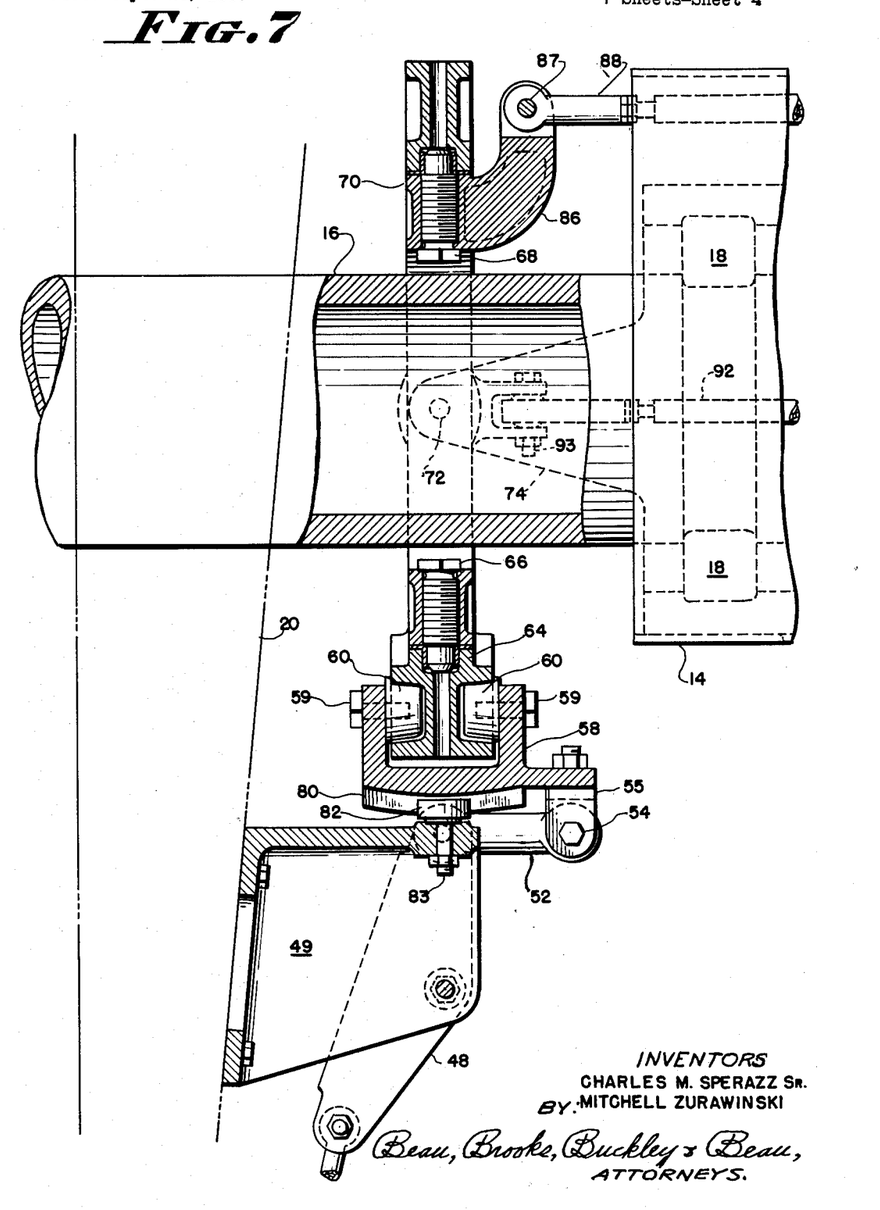
FIG. 7 is a fragmentary sectional view on a still further enlarged scale, taken along line VII—VII of FIG. 6.
Figure 8:
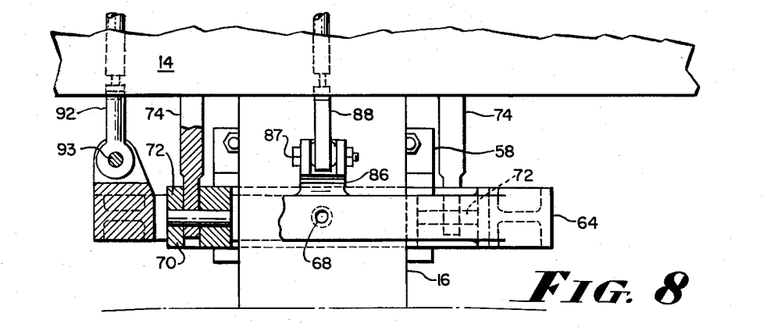
FIG. 8 is a fragmentary sectional view, partly in elevation, taken along line VIII—VIII of FIG. 6.

Thus as shown in the drawings herewith, the aircraft embodying the present invention comprises generally a fuselage 12 having wing panels 14—14 from which extend stub shafts 16—16 which are rotatably mounted therein as by means of thrust bearings 18 (FIG. 7). Propeller cowlings as indicated at 20 are fixed to the stub shafts 16, and thus are swingably mounted thereon relative to the wing panels at the outer ends thereof. The cowlings 20 enclose propellers as illustrated at 22; the latter being mounted in the cowling structures by any suitable hub devices as indicated at 24 (FIGS. 3, 4), and are connected to the propeller power supply engine means by any suitable power transmission mechanism (not shown) as is well known in the art. Thus, the ducted propellers 22 are arranged to be driven and angularly adjusted by pilot control means (not shown) between vertically and horizontally directed attitudes as shown in FIGS. 1 and 2.

The aircraft may of course also include an empennage structure comprising vertical stabilizer-rudder assemblies as indicated at 26, 28; a horizontal stabilizer as indicated at 29, and preferably a pitch control mechanism as indicated at 30 comprising upwardly and downwardly directed jet blast ducts and a suitable control valve therefor. Hence, the aircraft pilot may cause jet reaction blasts to issue alternatively from the upwardly and downwardly directed ducts, to control the "pitch" attitude of the aircraft, as explained for example in U.S. Patent No. 2,451,008. It is the primary purpose of the present invention to provide in conjunction with an aircraft arrangement as aforesaid an improved ducted propeller blast force and directional control mechanism, whereby to facilitate pilot maneuverings and control of the aircraft attitude throughout all phases of vertical or horizontal flight or hovering regimes.

To accomplish the aforesaid purposes, the cowling devices 20 are provided at their discharge end portions with spoiler flap mechanisms which as shown in the drawing herewith may take the form of split flap arrangements including paired flap portions 34, 36 which are hingedly mounted upon support tubes 38 diametrically spanning the interiors of the cowlings 20.

Figure 6:
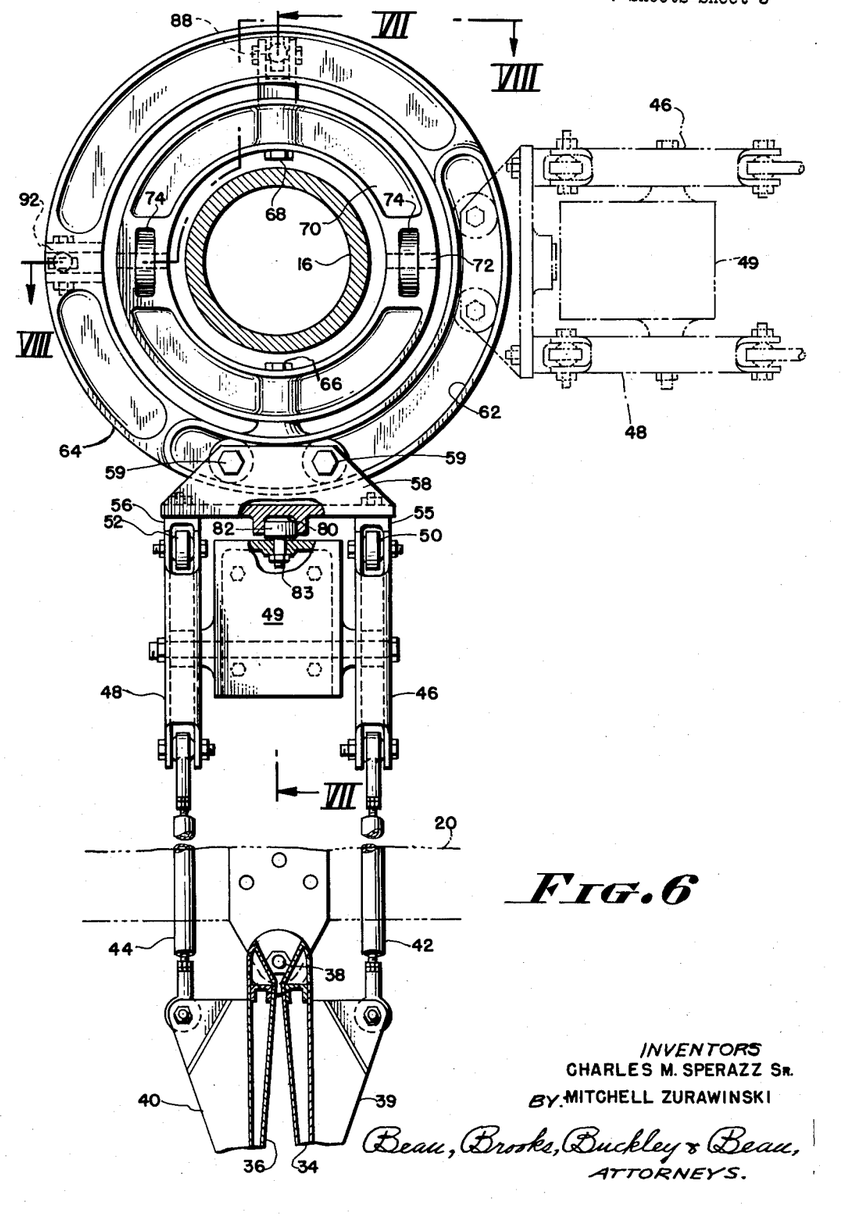
FIG. 6 is a still further enlarged fragmentary sectional view of a portion of the control mechanism, taken along line VI—VI of FIG. 4.

As shown in FIG. 6, the flap portions 34, 36 are provided with horns 39, 40 which in turn connect to push-pull control rods 42, 44 extending into operative connections with corresponding bell cranks 46, 48 which are in turn pivotally mounted upon a bracket 49 extending rigidly from the cowling structure. As shown in better detail in FIG. 7, the bell cranks 46, 48 are operatively connected at their upper ends to corresponding push-pull rods 50, 52 which pivotally connect as indicated at 53, 54 to corresponding clevices 55, 56, extending rigidly from a common control plate 58. The control plate is rigidly bolted as indicated at 59 to rollers 60 (FIG. 7) which run in grooved trackways 62 formed on opposite sides of a control ring 64; the control ring 64 comprising the outer member of a gimbal ring device and being pivotally mounted as indicated at 66, 68 upon the inner gimbal ring 70. This in turn is mounted by means of pins 72—72 upon bracket arms 74—74 extending rigidly from fixed internal structure of the wing panels 14—14. Thus, the pins 72, 72 are aligned upon common horizontal axes while the gimbal bearings 66, 68 are aligned about common vertical axes.

The control plate 58 is grooved at its bottom surface as indicated at 80 (FIGS. 6, 7) to receive in free sliding relation therein a roller 82 which is mounted upon a vertical axle 83 carried by the stationary bracket 49; the roller being disposed below the normal vertical position of the gimbal mechanism as shown in the drawing herewith. Thus it will be appreciated that the gimbal mechanism may be rocked about the horizontal axis of the pins 72, 72 (the grooved portion 80 of the control plate thereupon sliding laterally relative to the roller 82, as seen in FIG. 7) whereby the motion of the control plate will displace both of the push pull members 52—52 at equal rate in the same direction, thereby actuating both bell cranks and the control crank arms of the flap members 34, 36. Also, it will be seen that the outer ring portion 64 of the gimbal mechanism may be caused to pivot about the vertical axis of the pivot connection 66, 68, whereupon the control plate 58 will swivel upon the roller 82 and will thereby transmit opposite direction or differential motions through the push-pulls 52, 52 to the flap members 34, 36.

To effect such control motions of the gimbal mechanism, a crank arm 86 is provided to extend rigidly from the top center portion of the gimbal member 70 into pivotal connection at 87 (FIG. 7) with a push-pull member 88. As shown in FIG. 3 the push-pulls 88 are linked through corresponding bell crank and push-pull systems to the pilot control "stick" as indicated at 90, in such way that lateral motions of the control stick 90 will cause oppositely directed actuations of the connected push-pull systems. Such control motions are transmitted to the gimbal mechanisms at opposite sides of the aircraft, thereby causing corresponding displacements of the split-flap mechanisms at opposite sides of the aircraft. To effect such motions of the gimbal mechanism, a push-pull member 92 is coupled as indicated at 93 to the outer gimbal ring 64 at a position to one side of the vertical center line of pivoting of the gimbal mechanism as defined by the axis of the connections 66, 68. This push-pull device 92 is in each case coupled through means of an appropriate bell crank and push-pull linkage system to a conventional rudder control pedal system as indicated at 94 (FIG. 3). Hence pilot movements of the pedal system will not only actuate the conventional rudder 28 of the aircraft through members 95, but will simultaneously cause the gimbal mechanisms to pivot upon their vertical axes and to thereby transmit differential motions to the split-flap devices 34, 36 as will now be explained in further detail.

Figure 5:
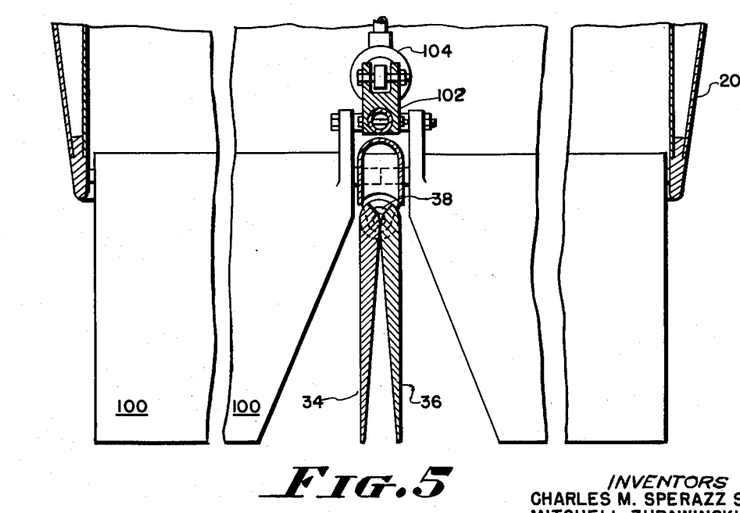
FIG. 5 is an enlarged scale fragmentary sectional view taken along line V—V of FIG. 4.
Figure 9:
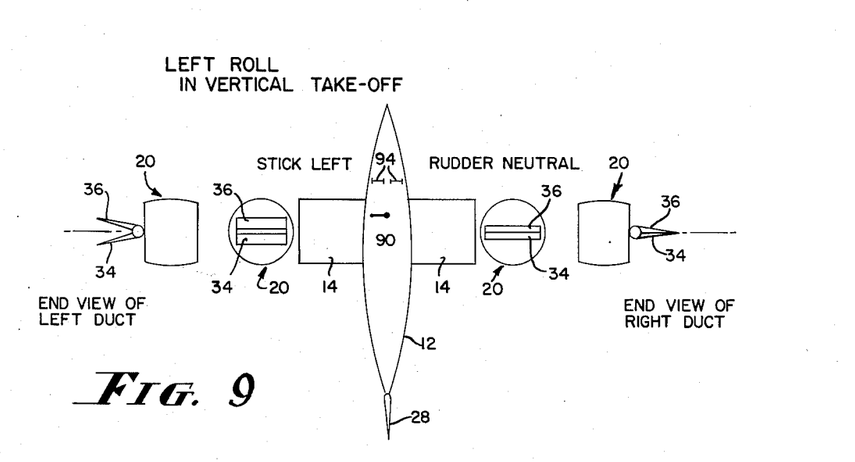
FIG. 9 is a diagrammatic illustration of the control flap settings and of the pilot control settings producing a left roll maneuver during a vertical flight or hovering operation.

Thus, examination of the control system as explained hereinabove will reveal that the split-flap control mechanisms are so arranged that when the ducted propeller units 20—20 are disposed in vertically directed attitude for hovering or vertical flight purposes, the thrust flap control mechanism is operable, for example, so that a rolling motion to the left (either for stability or maneuvering control) may be attained by simply moving the pilot control stick 90 to the left. As shown in FIG. 9, this control action will open the flaps 34—36 at the left hand duct unit, thus "spoiling" the maximum thrust effect of the propeller therein, while the flaps of the right hand duct are moved to closed position, the normal or "neutral" position of the flaps 34 and 36 being as shown in FIG. 5; and the resulting vertical thrust differential produces a rolling moment to the left. Obviously, opposite operation of the pilot stick 90 to the right, will produce an opposite or right roll effect.

Figure 10:
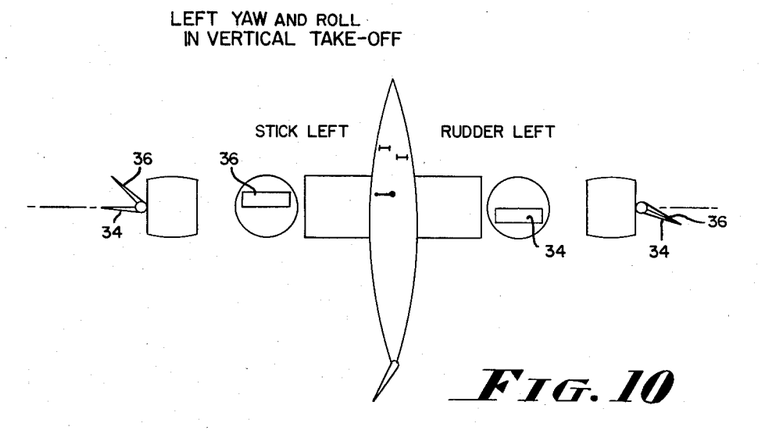
FIG. 10 is a view corresponding to FIG. 9, but relating to a maximum degree left yaw maneuver.
Figure 11:
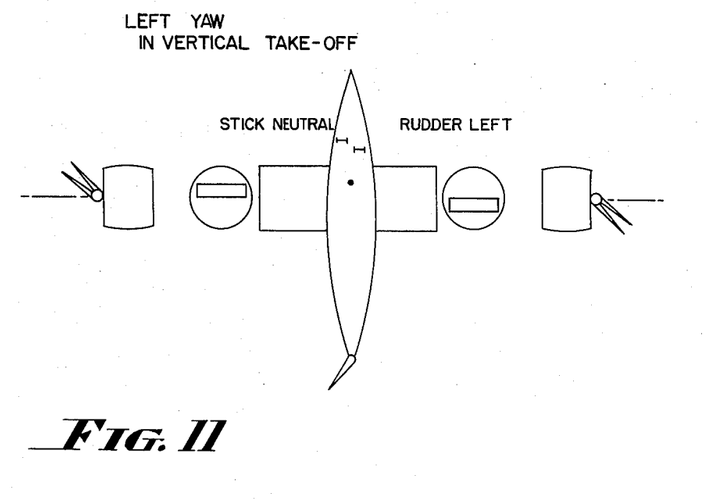
FIG. 11 corresponds to FIG. 10 but illustrates a minor degree left yaw maneuver setting.

FIG. 10 illustrates how combined left roll and left yaw control effect may be obtained (when in vertical flight) by "kicking" the rudder pedals for a left turn and simultaneously moving the stick to the left. These control actions, through the control mixing mechanism of the invention, turn the rudder to the left and open the flaps of the left hand duct to partially spoil the propeller thrust thereof while presenting an inclined deflection surface to it which reacts to drive the left wing of the craft rearwardly, while the flaps of the right hand duct are moved to closed position but swing to present a thrust deflection surface reacting to drive the right wing forwardly. Obviously, reverse actuations of the rudder pedals and control stick will procure an opposite or maximum right yaw effect.

It will be appreciated that the gimbal mechanism 70 is effective to permit the aircraft to be controlled in a conventional manner regardless of whether the cowlings are in vertical or horizontal position. This is achieved by virtue of the fact that the rudder control links 92 operate the gimbals about their vertical axes whereas the control stick links 88 control the gimbals about their horizontal axes, see particularly FIG. 3. Thus, whereas movement of the control stick to the left when the cowlings are vertically disposed will "spoil" the left propulsion unit 20, and will close the vanes or flaps on the right unit, the movement of the stick to the left when the cowlings are in the horizontal position will deflect the flaps of the left cowling structure 20 upwardly and will deflect the flaps of the right cowling 20 downwardly while leaving the flaps disposed in their "neutral" position. By the same token, the rudder control link 92 in each case will operate, when the cowlings are vertically disposed, to deflect the flaps 34 and 36 whereas the rudder control links 92 will operate to spread or move the flaps together when the cowlings are in the horizontal position. Thus, the arrangement used, in each case, is such that the conventional control motions achieve conventional control operations.

This is further emphasized in FIG. 6 wherein the full line showing of the bell cranks 46 and 48 and the structure therebelow is in the relative disposition such as is achieved when the cowlings are vertical whereas the dotted line showings of these bell cranks and their associated mechanism is in the position such as when the cowlings are in the horizontal position. From this figure, it will be manifest that when the bell cranks 46 and 48 are in the position corresponding to vertical disposition of the cowlings 20, movement of the gimbal mechanism about the vertical axis will effect the unison movement of each pair of flaps 34 and 36 although in different directions on opposite sides of the aircraft by virtue of the fact that one of the link 88 will be pushed while the other one will be pulled. By the same token, it will also be manifest that in FIG. 6, full line positions, movement of the gimbal mechanism about its horizontal axis will cause either spreading or closing of the vanes 34 and 36. Just the opposite is true when the dotted line position of the bell cranks 46 and 48 is assumed, corresponding to horizontal cowling position. In the dotted line position of the bell cranks 46 and 48, movement of the gimbal mechanism about its vertical axis will cause opening or closing of each pair of vanes 34 and 36 whereas movement of the gimbal about its horizontal axis will cause unison deflection of each pair of vanes 34 and 36.

Figure 12:
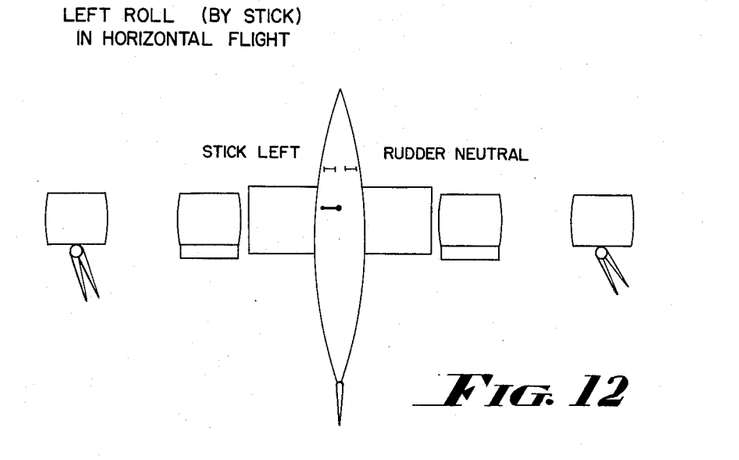
FIG. 12 illustrates a left roll control setting of the pilot stick, when the craft is in horizontal flight phase.
Figure 13:
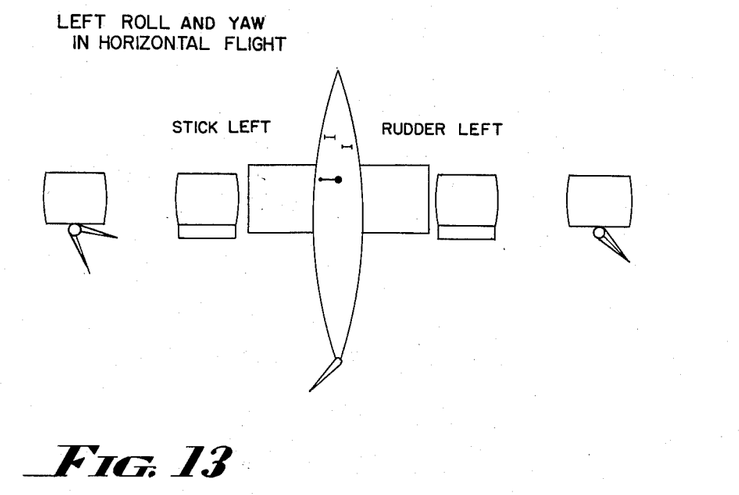
FIG. 13 shows how a left roll maneuver may be obtained by adjustment of the rudder controls, when in horizontal flight.

Typical control actions of the system of the invention when the aircraft is operating in horizontal flight mode are shown in FIGS. 12–13. For example, for stability control a left roll effect may be obtained simply by moving the control stick to the left (FIG. 12). This will cause the flap unit of the right hand cowl to pivot downwardly and the flap unit of the left hand cowl to pivot upwardly, thereby presenting to the propeller blasts reation surfaces tending to cause left roll. Obviously, opposite control of the stick will produce an opposite roll effect.

Thus, it will be appreciated that the mechanism of the invention includes control arrangements whereby the ducted propeller thrust control flaps are utilized in novel manner to perform multiple functions, both when in vertical and horizontal flight modes. The mechanisms so actuating the control flaps in response to conventional type pilot control motions are of utmost mechanical simplicity, and the differentially effected duct blast throttling and blast direction deflecting actions of the vanes provide, in combination with the conventional rudder and pitch control jets, for optimum turn and stability control effects.

Figure 4:
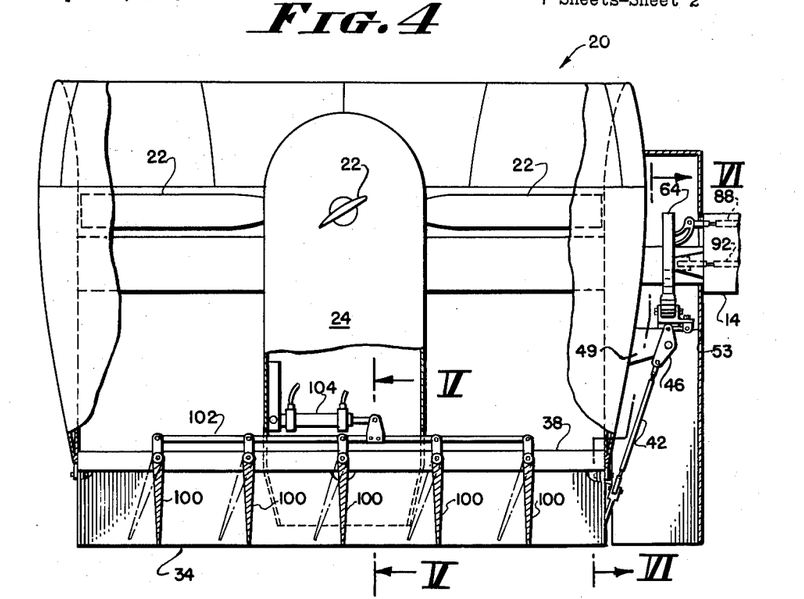
FIG. 4 is an enlarged scale vertical sectional view, taken along line IV—IV of FIG. 1.

As shown in FIGS. 1–5, the blast discharge ports of the propeller ducts 20—20 are each preferably also fitted with batteries of thrust direction deflection vanes as indicated at 100; these vanes being pivotally mounted upon suitable suspension members 101 and may be caused to pivot by means of push-rods 102 controlled by any suitable means such as a hydraulic jack or the like as indicated at 104 (FIGS. 4, 5). Such vanes may be employed to finally deflect the direction of the propeller blast discharges, such as away from vunerable parts of the aircraft or personnel being picked up by the aircraft, or the like.

It will of course be appreciated that whereas only one form of the invention has been shown, the inventive principles involved are capable of assuming other physical embodiments without departing from the spirit of the invention and the scope of the appended claims.

We claim:

1. In an aircraft of the vertical take-off and landing type, ducted propeller units mounted upon opposite sides of said aircraft and pivotable thereon between vertically directed and horizontally directed attitudes, flap means disposed in the blast exit portions of each of said ducts and selectively pivotable therein to various thrust throttling and direction deflecting positions, a rudder carried by said aircraft, a rudder control pedal system for manipulation by the aircraft pilot, a pitch control means carried by said aircraft, an attitude control device selectively movable by the pilot to effect pitch and roll control of the aircraft, and a mechanism interconnecting said rudder and pitch and flap controls including means automatically operable when said ducts are in either vertically or horizontally directed attitudes to cause said flaps in response to pilot actuations of the rudder and lateral control means to move differentially to thrust deflecting and thrust throttling positions coincident with control motions of said rudder.

2. In an aircraft of the vertical take-off and landing type, ducted propeller units mounted upon opposite sides of said aircraft and pivotable thereon between vertically directed and horizontally directed attitudes, split flap means disposed in the blast exit portions of each of said ducts and selectively pivotable therein to various thrust throttling and direction deflecting positions, a roll and yaw pilot control device selectively movable by the pilot to effect yaw and roll control of the aircraft, and a mechanism interconnecting said control device and said flaps including means automatically operable when said ducts are in either vertically or horizontally directed attitudes to cause said split flaps to move differentially to thrust deflecting positions and to thrust throttling positions.

3. In an aircraft of the vertical take-off and landing type, ducted propeller units mounted upon opposite sides of said aircraft and pivotable thereon between vertically directed and horizontally directed attitudes, flap means disposed in the blast exit portions of each of said ducts and selectively pivotable therein to various thrust throttling and direction deflecting positions, a rudder carried by said aircraft, a rudder control system for manipulation by the aircraft pilot, an attitude control device selectively movable by the pilot to effect yaw and roll control of the aircraft, and a mechanism interconnecting said rudder and flap controls including means automatically operable when said ducts are in either vertically or horizontally directed attitudes to cause said flaps to move differentially in response to pilot actuations of the pilot controls to thrust deflecting positions and to thrust throttling positions.

4. In an aircraft of the vertical take-off and landing type, ducted propeller units mounted upon opposite sides of said aircraft and pivotable thereon between vertically directed and horizontally directed attitudes, split flap means disposed in the blast exit portions of each of said ducts and selectively pivotable therein to various thrust throttling and direction deflecting positions, a rudder carried by said aircraft, a rudder control system for manipulation by the aircraft pilot, an attitude control device selectively movable by the pilot to effect attitude control of the aircraft, and mechanism interconnecting said pilot controls to means automatically operable when said ducts are in either vertically or horizontally directed attitudes to cause said split flaps to move differentially in response to pilot actuations of the control system in coordination with control motions of said rudder.

5. In an aircraft of the vertical take-off and landing type, ducted propeller units mounted upon opposite sides of said aircraft and pivotable thereon between vertically directed and horizontally directed attitudes, split flap means disposed in the blast exit portions of each of said ducts and selectively pivotable therein to various thrust throttling and direction deflecting positions, a rudder carried by said aircraft, a rudder control system for manipulation by the aircraft pilot, a pitch control means carried by said aircraft, an attitude control device selectively movable by the pilot to effect attitude control of the aircraft, and mechanism interconnecting said pilot controls to means automatically operable when said ducts are in either vertically or horizontally directed attitudes to cause said split flaps to move differentially in response to pilot actuations of the control system in coordination with control motions of said rudder and pitch control means.

6. In an aircraft of the vertical take-off and landing type, ducted propeller units mounted upon opposite sides of said aircraft and pivotable thereon between vertically directed and horizontally directed attitudes, split flap means disposed in the blast exit portions of each of said ducts and selectively pivotable therein to various thrust throttling and direction deflecting positions, a rudder carried by said aircraft, a rudder control pedal system for manipulation by the aircraft pilot, a pitch control means carried by said aircraft, an attitude control device selectively movable by the pilot to effect attitude control of the aircraft, and control motion mixing mechanism interconnecting said pilot controls to means operable when said ducts are in either vertically or horizontally directed attitudes to cause said split flaps to move differentially to thrust deflecting positions and to thrust throttling positions in coordination with control motions of the attitude control means of the aircraft.

7. In an aircraft of the vertical take-off and landing type, thrust means mounted on opposite sides of said aircraft and pivotable thereon between vertically directed and horizontally directed attitudes, split flap means disposed in the exit portions of each of said thrust means, pilot operable yaw control means, pilot operable roll control means, each split flap means including a pair of flaps independently pivotally mounted, means connecting said control members to said flap means to effect opposite pivotal motion to the flaps of each flap means upon actuation of said roll control means and pivotal motion of the flaps of each flap means in the same direction upon actuation of said yaw control means when said thrust means are vertically disposed and to effect opposite pivotal motion of the flaps of each flap means upon actuation of said yaw control means and pivotal motion of the flaps of each flap means in the same direction upon actuation of said roll control means when said thrust means are horizontally disposed.

8. In the aircraft as defined in claim 7 wherein said means connecting said control members to said flap means includes a gimbal device adjacent each thrust means.

9. In the aircraft as defined in claim 7 wherein said means connecting said control members to said flap means includes a gimbal device adjacent each thrust means, said roll control means being operative to pivot each gimbal device about a horizontal axis and said yaw control means being operative to pivot each gimbal device about a vertical axis.

References Cited in the file of this patent
UNITED STATES PATENTS

| | | |
|---|---|---|
| 2,420,323 | Meyer | May 13, 1947 |
| 2,961,189 | Doak | Nov. 22, 1960 |
| 2,971,725 | Jakimiuk | Feb. 14, 1961 |